(12) United States Patent
Kim (10) Patent No.: US 11,162,875 B2
(45) Date of Patent: Nov. 2, 2021

(54) SMART SAFETY MANAGEMENT SENSOR FOR MEASURING SAFETY-RELATED DATA OF STRUCTURE

(71) Applicant: TELCOKOREA IS, Inc., Daejeon (KR)

(72) Inventor: Jung Jip Kim, Daejeon (KR)

(73) Assignee: TELCOKOREA IS, Inc., Daejeon (KR)

( * ) Notice: Subject to any disclaimer, the term of this patent is extended or adjusted under 35 U.S.C. 154(b) by 0 days.

(21) Appl. No.: 16/990,385

(22) Filed: Aug. 11, 2020

(65) Prior Publication Data

US 2021/0285847 A1 Sep. 16, 2021

(30) Foreign Application Priority Data

Mar. 11, 2020 (KR) ........................ 10-2020-0029933

(51) Int. Cl.
*G01M 99/00* (2011.01)
*G01C 9/02* (2006.01)
*G01H 11/00* (2006.01)
*G01P 15/00* (2006.01)
*G01S 19/00* (2010.01)
*G01C 19/00* (2013.01)

(52) U.S. Cl.
CPC .............. *G01M 99/00* (2013.01); *G01C 9/02* (2013.01); *G01C 19/00* (2013.01); *G01H 11/00* (2013.01); *G01P 15/00* (2013.01); *G01S 19/00* (2013.01)

(58) Field of Classification Search
CPC ................................ G01M 99/00; G01C 9/02

USPC ............................................................ 702/56
See application file for complete search history.

(56) References Cited

U.S. PATENT DOCUMENTS

| 6,356,204 B1 * | 3/2002 | Guindi ................... G01V 1/008 340/665 |
| 2014/0324356 A1 * | 10/2014 | Park ..................... G01M 5/0066 702/15 |
| 2015/0355050 A1 * | 12/2015 | Yoshida ............... G01M 5/0066 702/56 |
| 2020/0309636 A1 * | 10/2020 | Tanaka ................ G01M 5/0008 |

FOREIGN PATENT DOCUMENTS

| JP | 2003028966 A | 1/2003 |
| KR | 1020030020536 A | 3/2003 |
| KR | 1020180057817 A | 5/2018 |
| KR | 1020180061091 A | 6/2018 |
| KR | 101939727 B1 | 1/2019 |

* cited by examiner

*Primary Examiner* — Ricky Go
(74) *Attorney, Agent, or Firm* — Rabin & Berdo, P.C.

(57) ABSTRACT

Disclosed is a sensor for receiving power from the outside and measuring data on a current state. A smart safety management sensor for measuring safety-related data of a structure includes a detection module installed in a structure and configured to detect a state of the structure at a preset interval, a control module operatively associated with the detection module and configured to calculate a result value based on data received by the detection module, and an output module operatively associated with the control module and configured to receive a result value calculated by the control module and to provide information to a supervisor.

6 Claims, 5 Drawing Sheets

SMART SAFETY MANAGEMENT SENSOR FOR MEASURING SAFETY-RELATED DATA OF STRUCTURE

This application claims the benefit of Korean Patent Application No. 10-2020-0029933, filed on Mar. 11, 2020, which is hereby incorporated by reference as if fully set forth herein.

BACKGROUND OF THE INVENTION

Field of the Invention

The present disclosure relates to a sensor for receiving power from the outside and measuring data on a structure, and more particularly to a safety management sensor for periodically measuring a changed value based on the data when an installed structure is initially installed and providing safety-related data to a user.

Description of the Related Art

A constructed structure or a building on the ground is installed in consideration of the state of the ground and the characteristics of the surrounding environment in which the constructed structure or the building is to be installed. To this end, a constructed structure method for reinforcing the durability of the constructed structure or the building with respect to the ground is necessarily performed prior to constructed structure or building.

Until the early 1990s, safety management for completely constructed or built facilities tends to be neglected compared to stages performed prior to constructed structure. Major accidents such as the collapse of Sampoong Department Store or Seongsudaegyo Bridge are examples showing the importance of safety management after constructed structure. In addition, recently, numerous earthquakes have occurred in Korea, which is regarded as being relatively safe from earthquakes, and accordingly, safety management, such as earthquake-resistant design, has become very important.

Korean Patent Publication No. 10-2018-0061091, which discloses a detailed embodiment of the aforementioned safety management, is a document related to a system for detecting earthquakes using a sensor. The system disclosed in the document includes a sensor unit for detecting an earthquake, a controller, and a plurality of output units, and transmits a warning signal to the plurality of output units based on an earthquake signal detected by the sensor unit. Thus, a danger signal is easily transmitted to people positioned inside and near a constructed structure.

However, the system disclosed in the document is disadvantageous in that it is not possible to calculate a shock applied to a constructed structure or a building for reasons other than an earthquake. That is, there is a limit in that the system is limited only to detecting earthquakes, among the numerous safety-related aspects of constructed structures or buildings.

Also, there is a problem in that the system disclosed in the document does not operate normally operate when the supply of power from outside the system is blocked.

CITED REFERENCE

Patent Document 1

Korean Patent Publication No. 10-2018-0061091 "Notification system for detecting earthquake of constructed structure using sensor" (Jun. 7, 2018)

SUMMARY OF THE INVENTION

Therefore, the present disclosure has been made in view of the above problems, and it is an object of the present disclosure to provide a smart safety management sensor for autonomously calculating a shock other than an earthquake applied to a constructed structure or a building and measuring the inclination of the constructed structure or the building.

In accordance with the present disclosure, the above and other objects can be accomplished by the provision of a smart safety management sensor for measuring safety-related data of a structure and for receiving power from an outside and measuring data on a current state including a detection module installed in the structure and configured to detect a state of the structure at a preset interval, a control module operatively associated with the detection module and configured to calculate a result value based on data received by the detection module, and an output module operatively associated with the control module and configured to receive a result value calculated by the control module and to provide information to a supervisor, wherein the detection module includes an inclination detector configured to measure vertical and horizontal displacement and an inclination of the structure, an acceleration detector configured to measure a vibration of the structure and of a region around the structure, an altitude detector configured to measure an altitude of the structure, and a gyro detector configured to correct a direction and a position in which the structure is installed, and further includes a self-diagnosis unit configured to periodically determine whether the inclination detector, the acceleration detector, the altitude detector, and the gyro detector operate, and wherein the acceleration detector includes a first acceleration detector configured to indirectly measure a vibration that occurs outside a constructed structure, and a second acceleration module configured to directly measure a vibration transmitted to an inside of the constructed structure due to the vibration measured by the first acceleration detector.

A minimum value of a frequency (Hz) of the vibration measured by the second acceleration detector may be greater than a maximum value of a frequency of the vibration measured by the first acceleration detector.

The control module may further include a first calculator configured to calculate movement and variation of the structure based on data received from the inclination detector, the acceleration detector, the altitude detector, and the gyro detector, and a second calculator configured to determine whether the detection module operates based on data received from the self-diagnosis unit.

The first calculator may convert an analog signal received from the detection module into a digital signal and may calculate data.

The smart safety management sensor may further include a power-supply-adjusting-module operatively associated with the operation detector and configured to measure and adjust electrical energy received from an outside.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Terms or words used in the specification and claims shall not be limited to having common or dictionary meanings, and shall be understood to have the meanings corresponding to technical aspects of the present disclosure in such a way that the inventor suitably defines the concept of the terms to most suitably express the present disclosure.

The features of embodiments and drawings of the specification are merely exemplary embodiments of the present disclosure and do not represent every technical feature thereof, and accordingly, it is to be appreciated that various equivalents and modifications that are capable of replacing the technical features of the present disclosure when the application is filed are encompassed herein.

Hereinafter, prior to the following description with reference to the drawings, it is noted that features that are not required in order to described the essence of the invention, that is, known configurations that are capable of being obviously added by one of ordinary skill in the art, are not illustrated, or are not described in detail.

Figure 1:
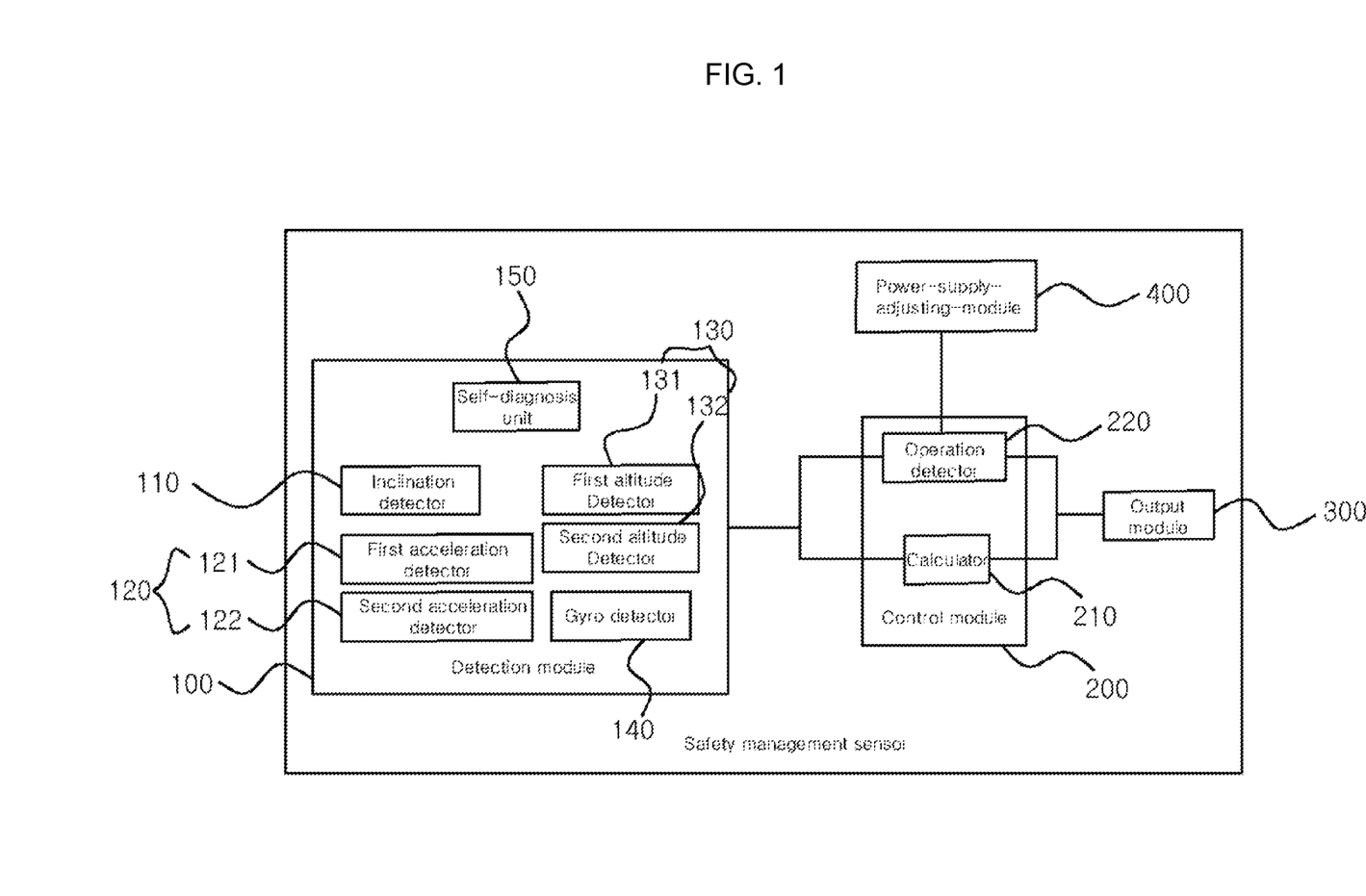
FIG. 1 is a diagram showing an example of a smart safety management sensor according to an embodiment of the present disclosure.

FIG. 1 is a diagram showing an example of a smart safety management sensor according to an embodiment of the present disclosure. The present disclosure relates to a sensor that is installed inside or outside a constructed structure and is configured to measure data and includes a plurality of modules for performing respective individual functions. The most important technological feature of the present disclosure is the sensor for autonomously calculating and controlling the measured data as well as simply measuring the data.

As shown in FIG. 1, the smart safety management sensor according to the present disclosure may include a detection module 100 for detecting and measuring a plurality of pieces of data on a constructed structure that is an installation target, a control module 200 that is operatively associated with the detection module 100 and controls the sensor of the present disclosure, and an output module 300 that is operatively associated with the control module 200 and transmits information on the current state of the constructed structure to a supervisor.

The detection module 100 may be a component for measuring a plurality of pieces of data at an interval set by the supervisor, and may further include an inclination detector 110 for measuring vertical and horizontal displacement of the constructed structure, an acceleration detector 120 for measuring magnitude in a region near the constructed structure, an altitude detector 130 for measuring the altitude of the constructed structure, a gyro detector 140 for measuring an error on three axes based on a reference point at which the sensor according to the present disclosure is installed, and a self-diagnosis unit 150 for determining whether the inclination detector 110, the acceleration detector 120, the altitude detector 130, and the gyro detector 140 operate.

In this case, the acceleration detector 120 for measuring the magnitude of the region around the constructed structure may further include a first acceleration detector 121 for measuring an impulse transmitted to the constructed structure due to the magnitude measured when an earthquake occurs, and a second acceleration detector 122 for measuring the impulse applied to a structure due to vibration such as strong wind or a typhoon as well as an earthquake. Each of the first acceleration detector 121 and the second acceleration detector 122 may include a component for detecting a frequency, and may be configured by different respective frequency bands for detecting vibration.

The altitude detector 130 for measuring the altitude of the constructed structure may further include a first altitude detector 131 for measuring the height from the ground on which the constructed structure is installed or a bottom surface of a corresponding layer and a second altitude detector 132 for measuring an altitude above sea level of the ground on which the constructed structure is installed. The above configuration is provided to implement 3D modeling based on a value that is calculated later by the control module 200 and may be used as a visual image to easily transmit information on the current state of the constructed structure to a supervisor.

The self-diagnosis unit 150 may include a component for detecting vibration, like the acceleration detector 120 and may be configured to detect vibration that occurs when the inclination detector 110, the acceleration detector 120, the altitude detector 130, and the gyro detector 140 operate, at respective periods.

The control module 200 may further include a calculator 210 for calculating the current state of the constructed structure based on a plurality of pieces of data measured by the detection module 100 and an operation detector 220 for examining the state of an operation of the detection module 100.

That is, the calculator 210 may be operatively associated with the inclination detector 110, the acceleration detector 120, the altitude detector 130, and the gyro detector 140, and may transmit information on the current state of the constructed structure to the supervisor after calculation using the data measured by the detection module 100. In this case, the calculator 210 may provide information as a visual image formed by 3D-modeling the calculated data to the supervisor, and may also provide the information as an acoustic signal through a separate notification signal. The method of providing the information may be determined by configuring the output module 300.

The calculator 210 may calculate an inclination on three axes based on vertical and horizontal displacement values of the constructed structure or the building, measured by the inclination detector 110. That is, a horizontal inclination of one arbitrary plane may be calculated by measuring horizontal displacement of the x-axis and the y-axis of the plane, and a sunken depth may be calculated by measuring a vertical displacement of the z-axis toward the ground. The total inclination of the constructed structure or the building may be calculated by re-calculating data on the horizontal inclination and the sunken depth.

In addition, the calculator 210 may estimate the total inclination of the constructed structure or the building with respect to other external shocks that occur later based on information on the impulse calculated by the acceleration detector 120 and the total inclination calculated by the inclination detector 110.

In this case, the calculator 210 may calculate a value using an analog-to-digital conversion (ADC) method. That is, an analog signal received by the detection module 100 may be converted into a digital signal, and then data calculation may be performed.

The operation detector 220 may be a component that is operatively associated with the self-diagnosis unit 150, and may receive a signal detected by the self-diagnosis unit 150 and determine whether a component for measuring current data operates. In this case, when an abnormal state of the plurality of detectors is detected, the detection information may be transmitted to the supervisor. The operation detector 220 may be operatively associated with a separate power-supply-adjusting-module 400, and may temporarily supply power in an emergency in which power supplied from the outside is unintentionally interrupted, and accordingly, the functions of respective components may be smoothly performed.

Figure 2:
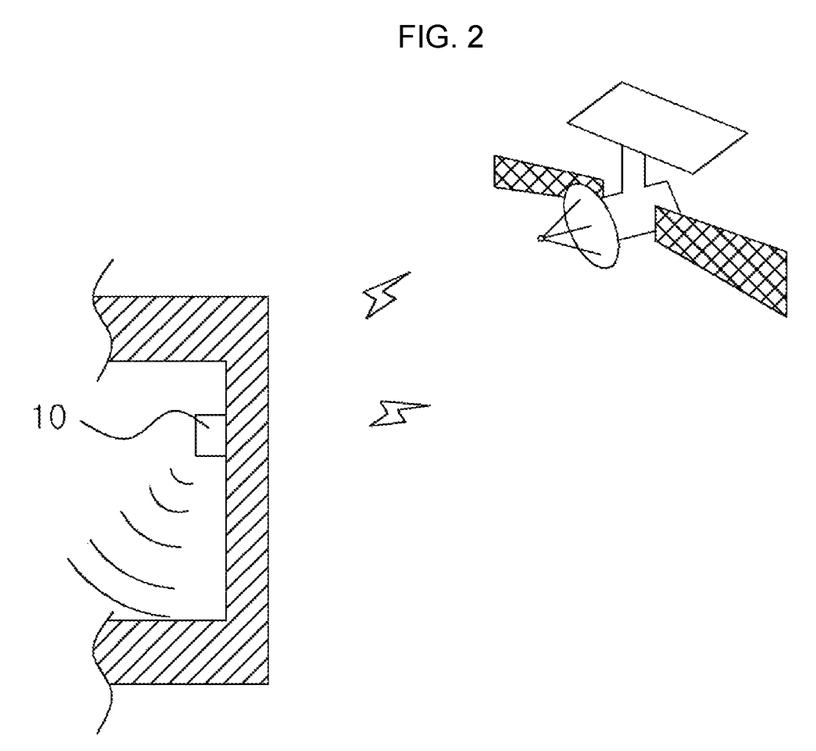
FIG. 2 is a diagram showing an example of a state in which an altitude is detected according to the present disclosure.

FIG. 2 is a diagram showing an example of the state in which an altitude is detected according to the present disclosure. As described above, the altitude detector 130 may include the first altitude detector 131, for measuring the height from the ground on which a constructed structure is installed or a layer beneath the layer on which the constructed structure is installed, and the second altitude detector 132, for measuring the altitude above sea level of the position at which the constructed structure is installed. In this case, as shown in FIG. 2, the first altitude detector 131 may receive a signal that is transmitted toward the ground or bottom surface and is reflected therefrom and may measure corresponding data. The second altitude detector 132 may receive data on the current position at which the constructed structure is installed from a satellite, and may measure corresponding data.

Figure 3:
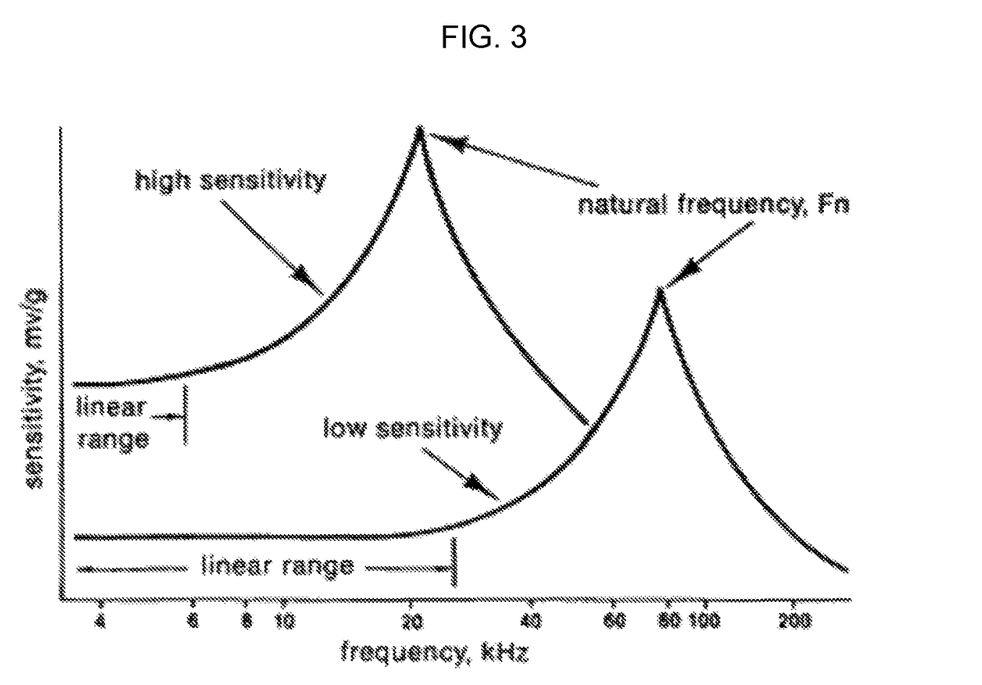
FIG. 3 is a graph showing frequency bands measured by a first acceleration detector and a second acceleration detector according to the present disclosure.

FIG. 3 is a graph showing frequency bands measured by the first acceleration detector 121 and the second acceleration detector 122 according to the present disclosure. As shown in FIG. 3, the frequency band measured by the first acceleration detector 121 and the frequency band measured by the second acceleration detector 122 may be configured to be different from each other. The above configuration may be provided to minimize a frequency range that is not measured by one accelerometer because a number of vibrations per second of the constructed structure due to an earthquake and the number of vibrations per second of the constructed structure due to a change in the weather, rather than an earthquake are different. That is, this means that it is possible to measure the shock applied to the constructed structure due to an earthquake and the shock applied to the constructed structure due to a change in the weather.

Due to the aforementioned configuration, the calculator 210 may configure the influence on the constructed structure in the form of data by analyzing the magnitude transmitted to the constructed structure for each magnitude of earthquake, and simultaneously may configure the influence on the constructed structure for reasons such as the weather, temperature, or humidity at the time due to a change in the weather in the form of data.

Figure 4:
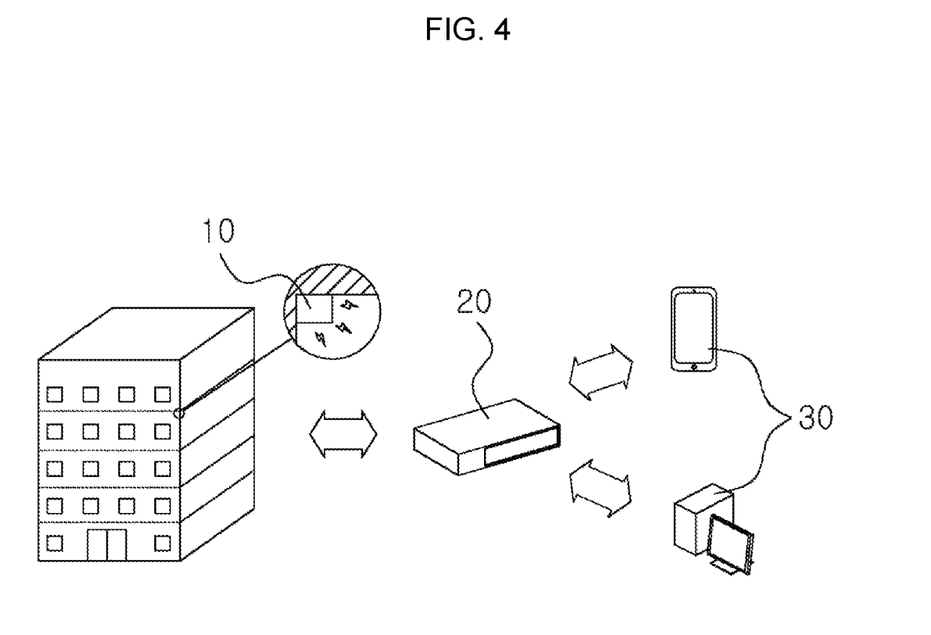
FIG. 4 is a diagram showing an example of a system for detecting an abnormal state according to an embodiment of the present disclosure.

FIG. 4 is a diagram showing an example of a system for detecting an abnormal state according to an embodiment of the present disclosure. As shown in FIG. 4, the system according to the present disclosure may include a separate server 20 and an output unit 30. In this case, the output module 300 may include a component for transmitting and receiving data to and from the server 20. That is, the output module 300 may include a wireless communication module such as Wi-Fi, RF, and LTE or a wired communication module such as the Ethernet. The output module 300 may further include a warning unit for autonomously transmitting a notification signal. For example, when the state of the constructed structure is determined to be abnormal due to data calculated by the calculator 210 or the operation detector 220 detects an abnormal state of the detection module 100, the warning unit may autonomously transmit a visual or acoustic signal and may notify a supervisor or people around the constructed structure about the current situation.

Figure 5:
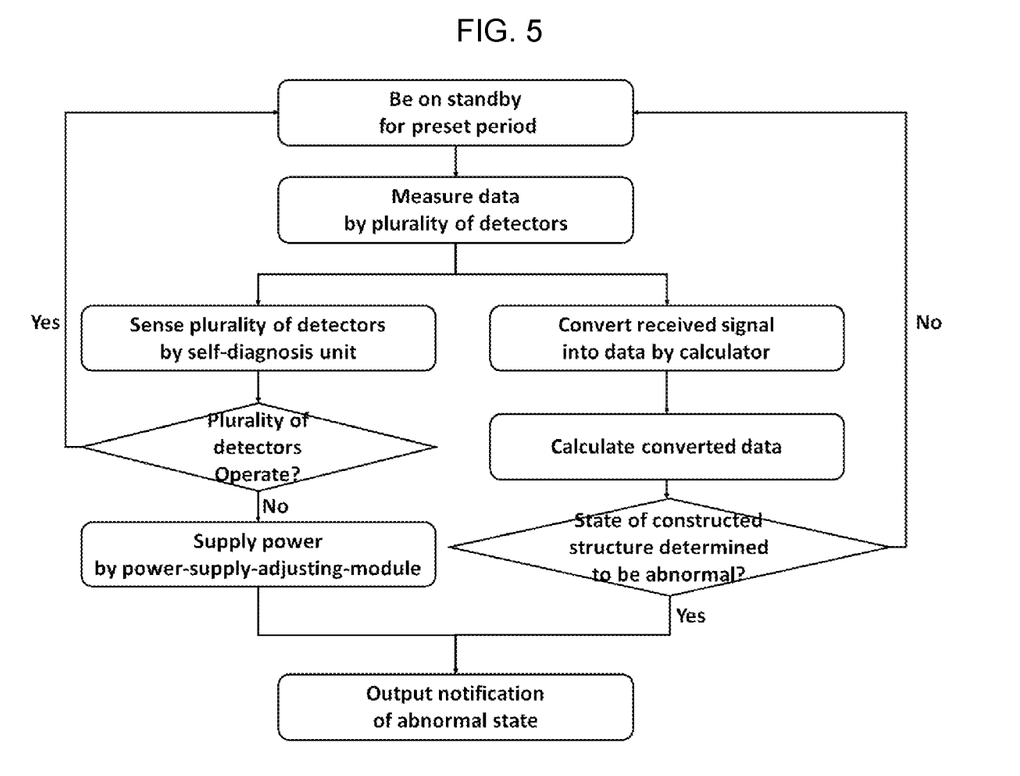
FIG. 5 is a diagram showing an example of a method of detecting an abnormal state according to the present disclosure.

FIG. 5 is a diagram showing an example of a method of detecting an abnormal state according to the present disclosure. As shown in FIG. 5, an operation in which components according to the present disclosure are on standby may be performed for a time that is preset by a supervisor. Then, when a preset period is reached, an operation in which the inclination detector 110, the acceleration detector 120, the altitude detector 130, and the gyro detector 140 measure data may be performed. In this case, the data measured by the plurality of detectors may be measured in the form of an analog signal.

In order to recognize normal performance of the above operation, an operation in which the self-diagnosis unit 150 senses the plurality of detectors in a dependent manner may be performed. In the present operation, the self-diagnosis unit 150 may sense vibration that occurs when a plurality of detectors operates, and the operation detector 220 may determine whether the plurality of detectors operates normally. In this case, when the plurality of detectors is determined to operate normally, the method may return to the operation in which the components are on standby for a preset period. In contrast, when the plurality of detectors is determined not to operate normally, an operation of supplying power from the power-supply-adjusting-module and an operation of transmitting a notification indicating the abnormal state may be performed.

Separately therefrom, the calculator 210 may perform an operation of converting an analog signal transmitted from the plurality of detectors into digital data. Then, an operation of calculating data converted using a digital method and an operation of determining that the constructed structure is in an abnormal state may be performed. In this case, when abnormal data is not obtained with regard to the safety of the constructed structure, the method may return to an operation in which the components remain on standby for a preset period. In contrast, when the calculator 210 obtains abnormal data, an operation of transmitting information on the abnormal state may be performed.

According to the present disclosure, it may be possible to calculate an impulse received by a constructed structure or a building with respect to an earthquake and other types of vibration such as a typhoon or strong wind that occurs around the constructed structure or the building, and it may be measure an inclination due to a reduction in durability along with deterioration of the constructed structure or the building, thereby improving the accuracy of safety management.

Thus far, the present disclosure has been described in terms of exemplary embodiments of the present disclosure.

The features of embodiments and drawings of the specification are merely exemplary embodiments of the present disclosure and do not represent every technical feature, and accordingly it is to be appreciated that various equivalents and modifications that are capable of replacing the technical features of the present disclosure are encompassed herein.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A smart safety management sensor for measuring safety-related data of a structure and for receiving power from an outside and measuring data on a current state, comprising:
    a detection module installed in the structure and configured to detect a state of the structure at a preset interval;
    a control module operatively associated with the detection module and configured to calculate a result value based on data received by the detection module; and
    an output module operatively associated with the control module and configured to receive a result value calculated by the control module and to provide information to a supervisor,
    wherein the detection module comprises an inclination detector configured to measure vertical and horizontal displacement and an inclination of the structure, an acceleration detector configured to measure a vibration of the structure and of a region around the structure, an altitude detector configured to measure an altitude of the structure, and a gyro detector configured to correct a direction and a position in which the structure is installed,
    wherein the acceleration detector comprises a first acceleration detector configured to indirectly measure a vibration that occurs outside a constructed structure, and a second acceleration detector configured to directly measure a vibration transmitted to an inside of the constructed structure due to the vibration measured by the first acceleration detector, and
    wherein a minimum value of a frequency (Hz) of the vibration measured by the second acceleration detector is greater than a maximum value of a frequency of the vibration measured by the first acceleration detector.

2. A smart safety management sensor for measuring safety-related data of a structure and for receiving power from an outside and measuring data on a current state, comprising:
    a detection module installed in the structure and configured to detect a state of the structure at a preset interval;
    a control module operatively associated with the detection module and configured to calculate a result value based on data received by the detection module; and
    an output module operatively associated with the control module and configured to receive a result value calculated by the control module and to provide information to a supervisor,
    wherein the detection module comprises an inclination detector configured to measure vertical and horizontal displacement and an inclination of the structure, an acceleration detector configured to measure a vibration of the structure and of a region around the structure, an altitude detector configured to measure an altitude of the structure, and a gyro detector configured to correct a direction and a position in which the structure is installed,
    wherein the acceleration detector comprises a first acceleration detector configured to indirectly measure a vibration that occurs outside a constructed structure, and a second acceleration detector configured to directly measure a vibration transmitted to an inside of the constructed structure due to the vibration measured by the first acceleration detector, and
    wherein the altitude detector further comprises:
        a first altitude detector configured to measure a height from a bottom surface; and
        a second altitude detector configured to receive data on a position of the constructed structure and an altitude above sea level of a corresponding area from a satellite.

3. A smart safety management sensor for measuring safety-related data of a structure and for receiving power from an outside and measuring data on a current state, comprising:
    a detection module installed in the structure and configured to detect a state of the structure at a preset interval;
    a control module operatively associated with the detection module and configured to calculate a result value based on data received by the detection module; and
    an output module operatively associated with the control module and configured to receive a result value calculated by the control module and to provide information to a supervisor,
    wherein the detection module comprises an inclination detector configured to measure vertical and horizontal displacement and an inclination of the structure, an acceleration detector configured to measure a vibration of the structure and of a region around the structure, an altitude detector configured to measure an altitude of the structure, and a gyro detector configured to correct a direction and a position in which the structure is installed,
    wherein the acceleration detector comprises a first acceleration detector configured to indirectly measure a vibration that occurs outside a constructed structure, and a second acceleration detector configured to directly measure a vibration transmitted to an inside of the constructed structure due to the vibration measured by the first acceleration detector,
    wherein the detection module further comprises a self-diagnosis unit configured to periodically determine whether the inclination detector, the acceleration detector, the altitude detector, and the gyro detector operate, and
    wherein the control module further comprises:
        a calculator configured to calculate movement and variation of the structure based on data received from the inclination detector, the acceleration detector, the altitude detector, and the gyro detector; and
        an operation detector configured to determine whether the detection module operates based on data received from the self-diagnosis unit.

4. The smart safety management sensor of claim 3, wherein the calculator estimates and calculates an inclination value changed depending on other external shocks that occur later using an inclination value measured by the inclination detector and an impulse value measured by the acceleration detector.

5. The smart safety management sensor of claim 3, further comprising:
    a power-supply-adjusting-module operatively associated with the operation detector and configured to measure and adjust electrical energy received from an outside.

6. A smart safety management sensor for measuring safety-related data of a structure, comprising:

a detection module installed in a structure and configured to detect a state of the structure at a preset interval, and further comprising an inclination detector configured to measure vertical and horizontal displacement and an inclination of the structure, an acceleration detector configured to measure a vibration of the structure and a region around the structure, an altitude detector configured to measure an altitude of the structure, and a gyro detector configured to correct a direction and a position in which the structure is installed, wherein the acceleration detector comprises a first acceleration detector configured to indirectly measure a vibration that occurs outside a constructed structure, and a second acceleration detector configured to directly measure a vibration transmitted to an inside of the constructed structure due to the vibration measured by the first acceleration detector; and wherein the altitude detector comprises a first altitude detector configured to measure a height from a bottom surface, and a second altitude detector configured to receive data on a position of the constructed structure and an altitude above sea level of a corresponding area from a satellite.

\* \* \* \* \*